United States Patent
Lin

(10) Patent No.: US 10,481,837 B2
(45) Date of Patent: Nov. 19, 2019

(54) DATA STORAGE DEVICE AND METHOD FOR OPERATING DATA STORAGE DEVICE WITH EFFICIENT TRIMMING OPERATIONS

(71) Applicant: Silicon Motion, Inc., Jhubei, Hsinchu County (TW)

(72) Inventor: Cheng-Yi Lin, Zhudong Township, Hsinchu County (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 15/813,573

(22) Filed: Nov. 15, 2017

(65) Prior Publication Data

US 2018/0321883 A1   Nov. 8, 2018

(30) Foreign Application Priority Data

May 8, 2017   (TW) .............................. 106115112 A

(51) Int. Cl.
| | |
|---|---|
| *G06F 12/00* | (2006.01) |
| *G06F 3/06* | (2006.01) |
| *G06F 13/16* | (2006.01) |
| *G06F 12/02* | (2006.01) |
| *G06F 13/00* | (2006.01) |
| *G06F 13/28* | (2006.01) |

(52) U.S. Cl.
CPC ........ *G06F 3/0679* (2013.01); *G06F 12/0246* (2013.01); *G06F 13/1694* (2013.01)

(58) Field of Classification Search
CPC ...... G06F 3/0679; G06F 3/064; G06F 3/0611; G06F 12/0246; G06F 13/1694
See application file for complete search history.

(56) References Cited

U.S. PATENT DOCUMENTS

| | | | |
|---|---|---|---|
| 2009/0292839 A1* | 11/2009 | Oh ...................... | G06F 12/0246 710/55 |
| 2010/0185808 A1* | 7/2010 | Yu ....................... | G06F 13/1684 711/103 |
| 2011/0145306 A1 | 6/2011 | Boyd et al. | |
| 2012/0059976 A1* | 3/2012 | Rosenband ............ | G06F 3/061 711/103 |

(Continued)

FOREIGN PATENT DOCUMENTS

| | | |
|---|---|---|
| CN | 105760110 A | 7/2016 |
| CN | 105760311 A | 7/2016 |

Primary Examiner — Mark A Giardino, Jr.
(74) Attorney, Agent, or Firm — McClure, Qualey & Rodack, LLP

(57) ABSTRACT

A data storage device with improved space-trimming capability. A microcontroller operating in accordance with a host allocates a non-volatile memory to store data. The microcontroller manages the mapping information between the logical addresses used by the host and the space of the non-volatile memory. The microcontroller further takes responsibility for the transformation of a trimming command that is issued by the host to invoke a plurality of trimming requests. After the transformation, a target-host block repeatedly indicated by the plurality of trimming requests is transformed to be trimmed at one time. The mapping information of the target-host block, therefore, is not read frequently from the non-volatile memory for real-time amendment.

17 Claims, 6 Drawing Sheets

(56) References Cited

U.S. PATENT DOCUMENTS

| | | | |
|---|---|---|---|
| 2012/0110249 A1* | 5/2012 | Jeong | G06F 3/0616 |
| | | | 711/103 |
| 2013/0132650 A1 | 5/2013 | Choi et al. | |
| 2013/0219106 A1* | 8/2013 | Vogan | G06F 12/0246 |
| | | | 711/103 |
| 2013/0275660 A1 | 10/2013 | Bennett | |
| 2014/0129758 A1 | 5/2014 | Okada et al. | |
| 2015/0363425 A1* | 12/2015 | Li | G06F 12/0246 |
| | | | 707/690 |
| 2017/0160989 A1* | 6/2017 | Hsieh | G06F 3/061 |
| 2017/0242584 A1* | 8/2017 | Zhang | G06F 3/061 |

\* cited by examiner

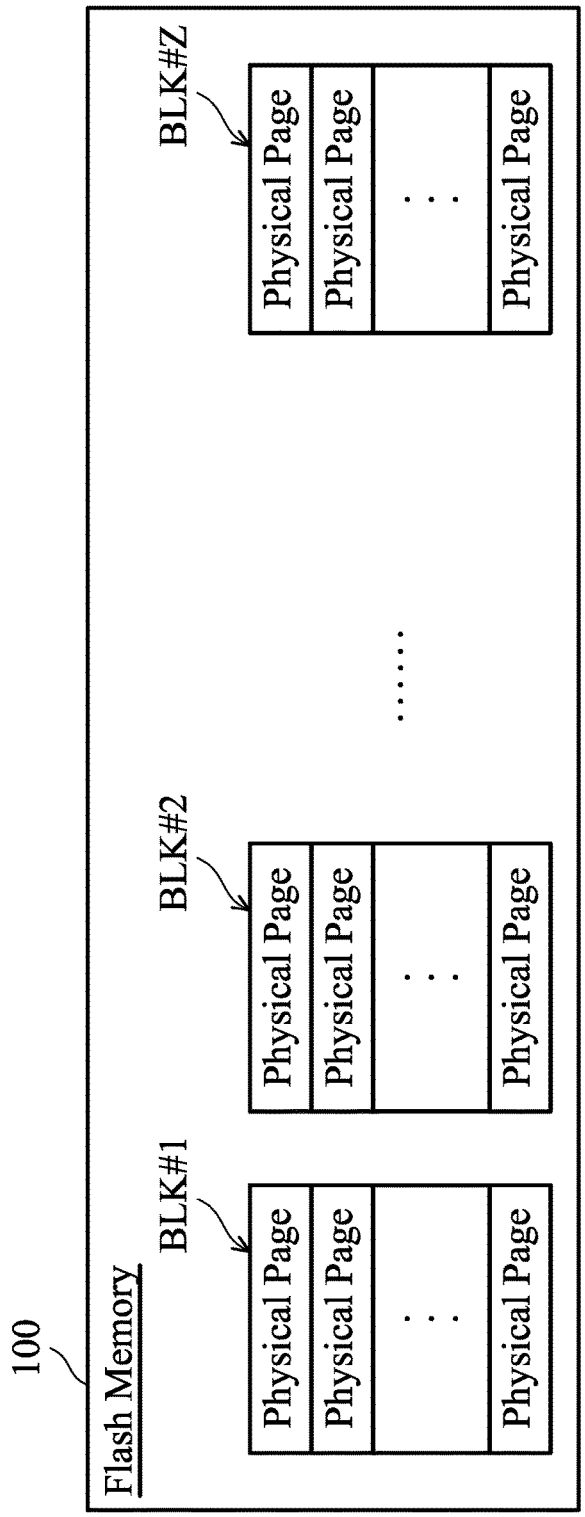
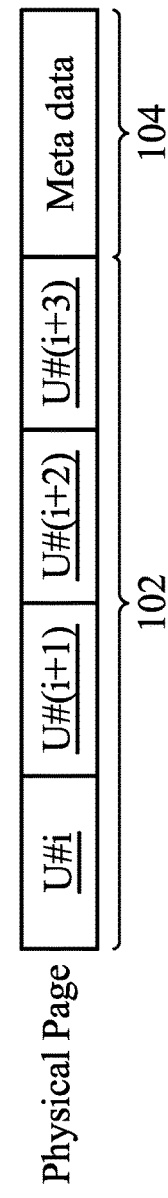
FIG. 1A
FIG. 1B

| H2F | Logical Address | Physical Address |
|---|---|---|
| | 1 | (BLK#,U#) |
| | ... | ... |
| | j | (BLK#,U#) |
| | (j+1) | (BLK#,U#) |
| | ... | ... |
| | 2j | (BLK#,U#) |
| | ... | ... |

H2F_H#1: rows 1 through j
H2F_H#2: rows (j+1) through 2j
...

FIG. 2

Trimming Command

Trmming Request #1: | H#5 | H#6 | H#7 |

Trmming Request #2: | H#3 | H#4 | H#5 |

Trmming Request #3: | H#6 | H#7 |

Trmming Request #4: | H#3 | H#4 |

DATA STORAGE DEVICE AND METHOD FOR OPERATING DATA STORAGE DEVICE WITH EFFICIENT TRIMMING OPERATIONS

CROSS REFERENCE TO RELATED APPLICATIONS

This Application claims priority of Taiwan Patent Application No. 106115112, filed on May 8, 2017, the entirety of which is incorporated by reference herein.

BACKGROUND OF THE INVENTION

Field of the Invention

The present invention relates to data storage devices, and in particular to space-trimming of non-volatile memory.

Description of the Related Art

There are various non-volatile memories used in data storage devices for long-term data storage, such as flash memory, magnetoresistive RAM, ferroelectric RAM, resistive RAM, spin transfer torque-RAM (STT-RAM), and so on.

The performance of a data storage device is limited due to the operational characteristics of non-volatile memory. How to enhance the performance of data storage devices is an important issue in this area of technology.

BRIEF SUMMARY OF THE INVENTION

An integrated space-trimming technique is introduced in the disclosure. A trimming command issued from a host, therefore, does not consume excessive calculation resources.

A data storage device in accordance with an exemplary embodiment of the disclosure includes a non-volatile memory, a random-access storage space, and a microcontroller. The microcontroller is operated by a host to allocate the non-volatile memory for data storage and manage mapping information between logical addresses used in the host and space in the non-volatile memory. The microcontroller transforms a trimming command issued by the host and thereby a target-host block requested to be trimmed several times in trimming requests contained in the trimming command is transformed to be trimmed at one time. For the target-host block that has been transformed to be trimmed at one time instead of being trimmed several times, the microcontroller downloads a corresponding target-host block-mapping table from the non-volatile memory to the random-access storage space. The microcontroller further modifies the target-host block-mapping table on the random-access storage space to invalidate the mapping information that corresponds to the trimming requests contained in the trimming command.

In an exemplary embodiment, each of the trimming requests indicates a logical address section using data length and the starting logical address. The microcontroller joins overlapping or continuous logical address sectors indicated by the trimming requests contained in the trimming command. The microcontroller may further cut the joined logical address sectors to align trimming cells. A head or a tail of the joined logical address sectors not aligned to the trimming cells (e.g. smaller than one trimming cell) is cut off.

In another exemplary embodiment, a method for operating a data storage device is shown. The data storage device comprises a non-volatile memory. The method includes: providing a random-access storage space for the data storage device; in response to a host, allocating the non-volatile memory for data storage and managing mapping information between logical addresses used in the host and space of the non-volatile memory; transforming a trimming command issued by the host and thereby a target-host block requested to be trimmed several times in trimming requests contained in the trimming command is transformed to be trimmed one time; and, for the target-host block that has been transformed to be trimmed at one time instead of being trimmed several times, downloading a corresponding target-host block-mapping table from the non-volatile memory to the random-access storage space, and modifying the target-host block-mapping table on the random-access storage space to invalidate the mapping information that corresponds to the trimming requests contained in the trimming command.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIGS. 1A and 1B illustrate the physical space planning of a flash memory 100 in accordance with an embodiment of the disclosure;

FIG. 2 depicts a mapping table H2F with the logical address (LBA or GHP) as the index;

FIG. 3 is provided for discussion of a trimming command;

DETAILED DESCRIPTION OF THE INVENTION

Figure 4:
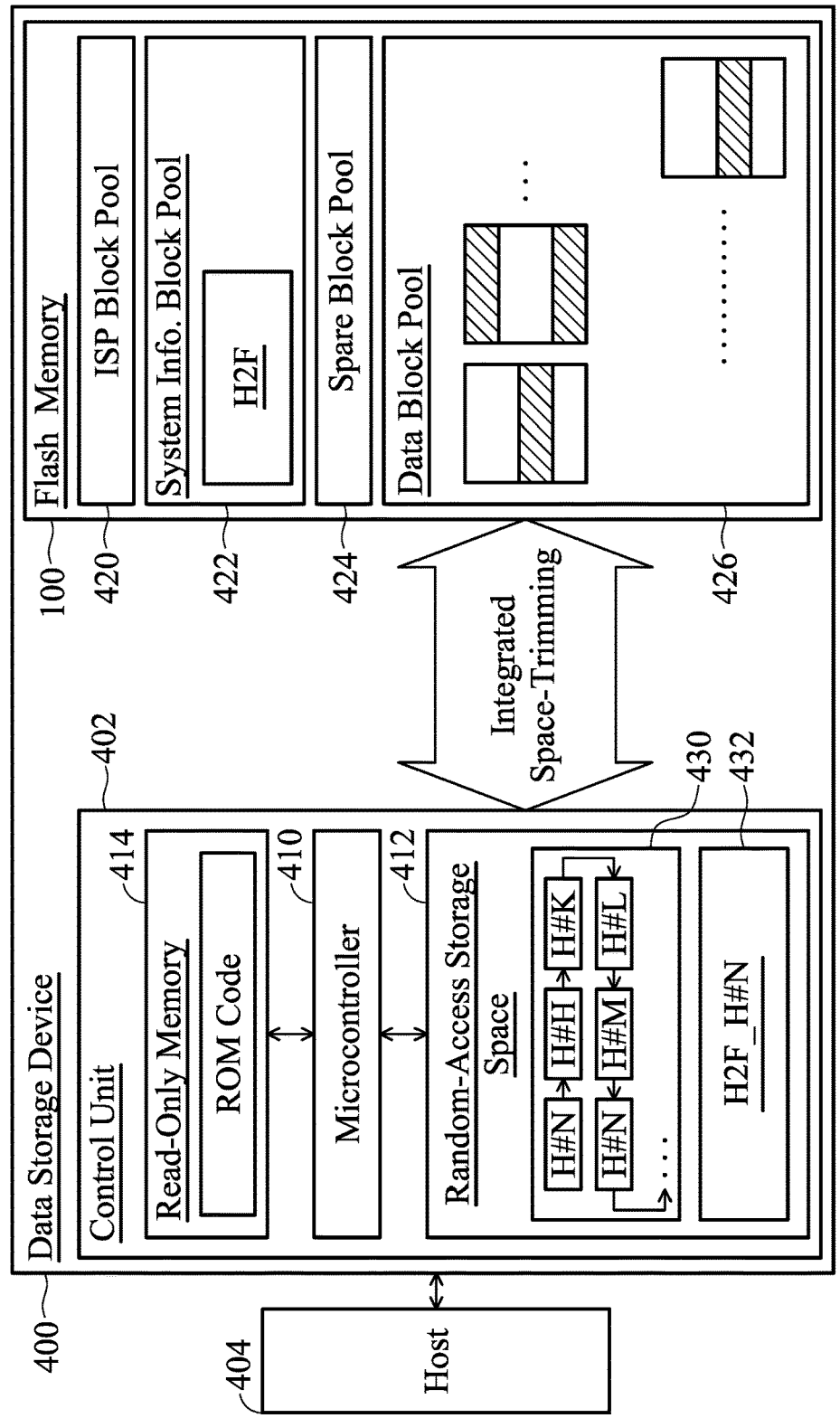
FIG. 4 is a block diagram depicting a data storage device 400 in accordance with an exemplary embodiment of the disclosure.

The following description shows exemplary embodiments of carrying out the invention. This description is made for the purpose of illustrating the general principles of the invention and should not be taken in a limiting sense. The scope of the invention is best determined by reference to the appended claims.

There are various forms of non-volatile memory for long-term data retention, such as flash memory, magnetoresistive RAM, ferroelectric RAM, resistive RAM, spin transfer torque-RAM (STT-RAM) and so on. The following discussion uses flash memory in particular as an example.

Today, flash memory is usually used as a storage medium in a data storage device, such as a memory card, an universal serial bus (USB) flash device, a solid state disk (SSD, NVMe, M.2, U.2), and so on. In an exemplary embodiment, a flash memory and a controller may be wrapped together as a multi-chip package named eMMC.

A data storage device using a flash memory as a storage medium may be applied to a variety of electronic devices. The electronic devices may be a smartphone, a wearable device, a tablet computer, a virtual reality device, etc. A central processing unit (CPU) in an electronic device may be regarded as a host that operates the connected data storage device.

FIGS. 1A and 1B illustrate the physical space planning of a flash memory 100 in accordance with an embodiment of the disclosure.

As shown in FIG. 1A, the storage space of the flash memory 100 is divided into a plurality of blocks (physical blocks) BLK#1, BLK#2 . . . BLK#Z, etc., where Z is a positive integer. Each physical block includes a plurality of physical pages, for example: 256 physical pages.

One physical page is further discussed in FIG. 1B. Each physical page includes a data area 102, and a spare area 104. The data area 102 may be divided into a plurality of storage units U#i, U#(i+1), U#(i+2), and U#(i+3) to be separately allocated for data storage of the issued logical addresses. There are many forms of logical addresses can be related to the allocated storage units. For example, the allocated storage units may correspond to data storage of logical block addresses (LBAs) or global host pages (GHPs). In an exemplary embodiment, the data area 102 is 16 KB and is divided into four 4 KB storage units U#i, U#(i+1), U#(i+2), and U#(i+3). Each 4 KB storage unit may be allocated to store data indicated by eight logical block addresses (e.g. LBA#0 to LBA#7) or one GHP. The spare area 104 is used to store metadata like the mapping information showing what logical addresses used at the host side that the data in the storage units U#i, U#(i+1), U#(i+2) and U#(i+3) corresponds to.

However, the mapping information recorded in the spare area 104 is not always valid. The flash memory 100 has a special physical property: the updated data is not overwritten on the storage space of old data. Instead, the updated data is written to a free space and the old data in the original space is invalidated. A mapping table (e.g. a table H2F showing the mapping from logical addresses to physical space) has to be dynamically managed for the flash memory 100.

FIG. 2 depicts a mapping table H2F with the logical address (LBA or GHP) as the index. In the mapping table H2F, how the storage space in the flash memory 100 is allocated for storing the data of the different logical addresses is shown. A block number BLK# and a storage unit number U# are presented to show the physical address that a logical address maps to. For a huge storage space, the mapping table H2F may be further divided into host block-mapping tables H2F_H#1, H2F_H#2 . . . H2F_H#Z corresponding to host blocks H#1, H#2 . . . H#Z, where Z is an integer number. In an exemplary embodiment, each host block-mapping table is 64 KB and is recorded in four consecutive physical pages to show mapping information of 8K data. One host block-mapping table may correspond to a section of logical addresses, like GPH#0 . . . #8191, GPH#8192 . . . #16383, GPH#16384 . . . #24575, GPH#24576 . . . #32767, or GPH#32768 . . . #40959, and so on. After being updated, the host block-mapping tables H2F_H#1, H2F_H#2 . . . H2F_H#Z may be stored to a specific physical block (e.g. a system block). In order to speed up the reading of the host block-mapping tables H2F_H#1, H2F_H#2 . . . H2F_H#Z, a list of indicators or a high-level mapping table may be provided to show where the different host block-mapping tables H2F_H#1, H2F_H#2 . . . H2F_H#Z are stored in the system block. The flash memory 100 is operated according to the mapping table H2F.

The aforementioned structure of the mapping table H2F makes a trimming command appropriate for the flash memory 100. The host can issue a trimming command to the data storage device to inform that some data is no longer valid. Accordingly, in the data storage device, the mapping information of the invalidated data may be removed from the mapping table H2F (for example, by invaliding the mapping information). The physical space with only invalid data remained may be recycled by a garbage collection. FIG. 3 is provided for discussion of a trimming command. There may be up to 500 trimming requests issued in one trimming command. Each trimming request may indicate at least one logical address section to be trimmed (e.g., indicated by data length and the starting logical address, or by the starting and ending logical addresses). In the mapping table H2F, the mapping information that indicates the logical address sections may be changed to a predefined value, e.g. 0xFFFF or 0x0000. The logical addresses to be trimmed have been amended no longer mapping to the flash memory 100.

Referring to FIG. 3, host blocks involved in the trimming requests are listed here in sequence: H#5, H#6, H#7, H#3, H#4, H#5, H#6, H#7, H#3, H#4. As shown, the same host block may be trimmed at different points in time, resulting in a system burden. How to optimize the trimming requests is an interesting technical issue.

FIG. 4 is a block diagram depicting a data storage device 400 in accordance with an exemplary embodiment of the disclosure, which includes the flash memory 100 and a control unit 402. The control unit 402 is coupled between a host 404 and the flash memory 100 to operate the flash memory 100 in accordance with commands issued by the host 404. The control unit 402 has a microcontroller 410, a random-access storage space 412, and a read-only memory 414. The random-access storage space 412 and the microcontroller 410 may be placed in the same die or made separately. Compared to a large-sized DRAM, the space of the random-access storage space 412 may be limited. For example, the random-access storage space 412 in an SD card may be implemented by a SRAM of 512 KB. A ROM code is stored in the read-only memory 414. An ISP (in-system programming) block pool 420 provided by the flash memory 100 is allocated to store ISP code. The microcontroller 410 operates by executing the ROM code stored in the read-only memory 414 or/and the ISP code stored in the ISP block pool 420. The random-access storage space 412 stores the dynamic information required during the operations of the microcontroller 410. In the disclosure, the control unit 402 applies an integrated space-trimming technique on the flash memory 100 with the help of the random-access storage space 412.

Referring to FIG. 4, the physical space of the flash memory 100 is further allocated to provide a pool 422 of system information blocks, a pool 424 of spare blocks and a pool 426 of data blocks. The pool 422 of system information blocks stores system information. For example, the mapping table H2F may be stored in the pool 422 of system information blocks for non-volatile storage. The mapping table H2F may be divided into host block-mapping tables H2F_H#1, H2F_H#2 . . . H2F_H#Z according to the concept introduced in FIG. 2. The microcontroller 410 may allocate the pool 424 of spare blocks to provide the space for data storage (e.g. storing write data received from the host 404 or storing valid data collected by garbage collection). When finishing storing data to the allocated block (e.g. filling the block full or only partially use the block because of an interruption), the allocated block is pushed into the pool 426 of data blocks as a data block. In the pool 426 of data blocks, those marked by oblique lines correspond to the logical address sections expected to be trimmed by a trimming command.

The microcontroller 410 may use the random-access storage space 412 to store a trimming command transmitted from the host 404, determines the logical address sections involved in the trimming requests contained in the trimming command, and determines the host block-mapping tables (H2F_H) relating to the logical address sections. In the exemplary embodiment, the host block-mapping tables (H2F_H) of the host blocks H#N, H#H, H#K, H#L, H#M and H#N are involved in sequence. N, H, K, L, M and N are numbers. By sorting the host block-mapping tables (H2F_H), the microcontroller 410 determines that several trimming requests are related to the host block-mapping table H2F_H#N. The microcontroller 410 downloads the host block-mapping table H2F_H#N from the flash memory 100 to the random-access storage space 412, and modifies (e.g. to "FFFF") the mapping information of the logical address sections requested to be trimmed by the multiple trimming requests altogether. After the modification, the microcontroller 410 stores the modified version of the host block-mapping table H2F_H#N from the random-access storage space 412 to the flash memory 100 for non-volatile storage of the mapping table H2F. The microcontroller 410, therefore, does not repeatedly downloads and stores the host block-mapping table H2F_H#N from and back to the flash memory 100. The performance of the trimming command performed by the data storage device 400 is considerably enhanced.

In an exemplary embodiment, the microcontroller 410 finds the union of the logical address sections requested by the trimming requests to generate a logical address union, determines the host block-mapping tables (H2F_H) related to the logical address union, and selects a target-host block in the order of the determined host block-mapping tables (H2F_H) or by weight to modify mapping information of the selected target-host block.

In an exemplary embodiment, an SRAM provides a first space 430 and a second space 432. The sorting for the trimming requests is performed on the first space 430. The second space 432 is for dynamical management of the downloaded hot block-mapping table.

Figure 5:
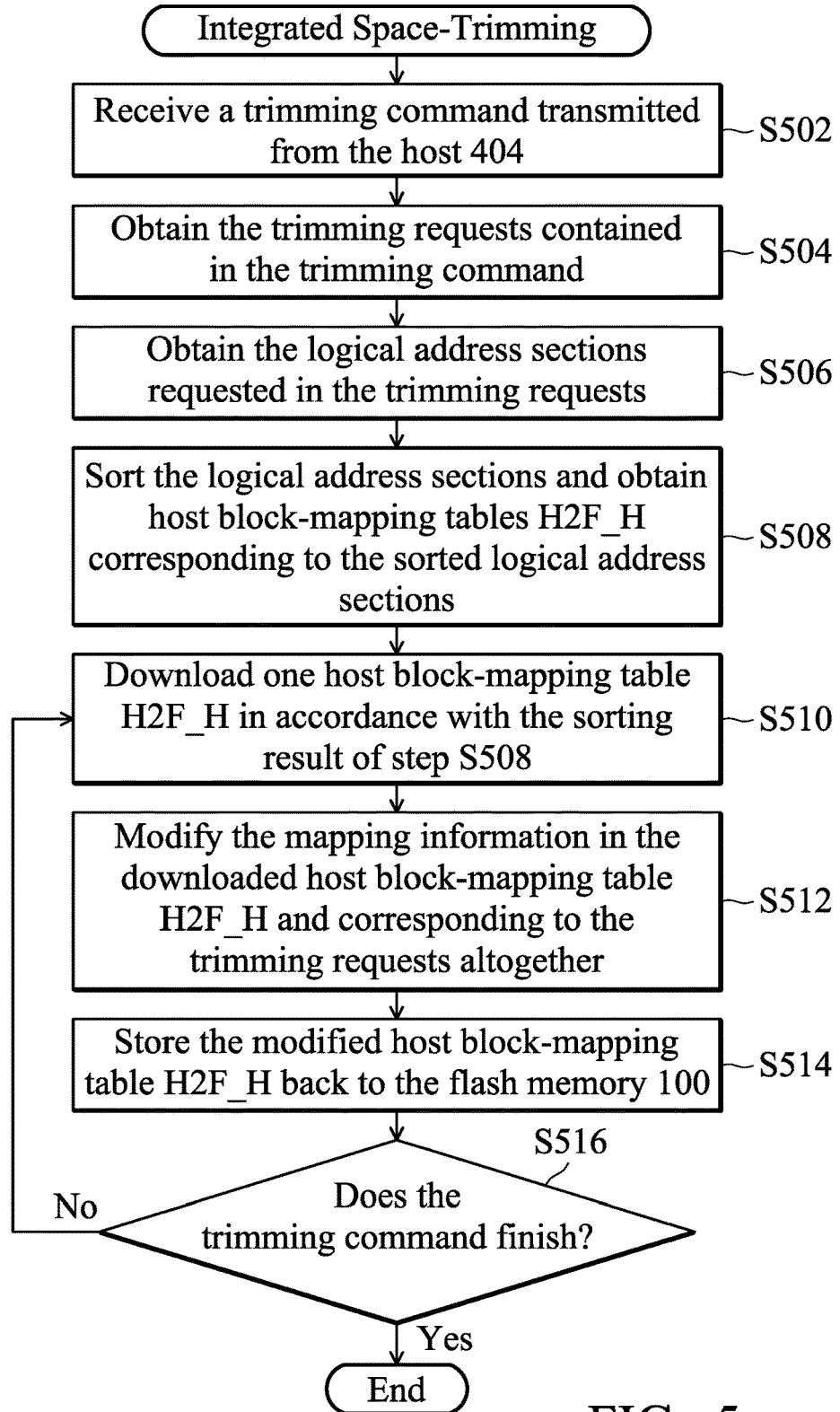
FIG. 5 is a flow chart depicting storage-space trimming in accordance with an exemplary embodiment of the disclosure.

FIG. 5 is a flow chart depicting storage-space trimming in accordance with an exemplary embodiment of the disclosure. In step S502, a trimming command transmitted from the host 404 is received. In step S504, the trimming requests contained in the trimming command are obtained. In step S506, the logical address sections requested in the trimming requests are obtained. In step S508, the logical address sections are sorted and host block-mapping tables H2F_H (e.g. H2F_H#10~#20) corresponding to the sorted logical address sections are obtained. In an exemplary embodiment, the host block-mapping tables H2F_H are obtained after the separated logical address sections have been jointed together. In another exemplary embodiment, a number sequence of the host block-mapping tables H2F_H related to the logical address sections expected to be trimmed is listed and then sorted and, accordingly, each host block-mapping table H2F_H is presented in the sorted sequence only once. In step S510, one host block-mapping table H2F_H (e.g. H2F_H#10) is downloaded (e.g. from the flash memory 100 to the random-access storage space 412) in accordance with the sorting result of step S508. In step S512, the mapping information in the downloaded host block-mapping table H2F_H and corresponding to the trimming requests is modified altogether. In step S514, the modified host block-mapping table H2F_H is stored back to the flash memory 100 to prevent from the information loss due to an unexpected power-off event. It is determined in step S516 whether the trimming command finishes. When the trimming command has not finished, step S510 is performed to download another host block-mapping table H2F_H (e.g. H2F_H#11) for modification. When it is determined in step S516 that no more host block-mapping table H2F_H has to be modified for performing the trimming command, the procedure ends.

In an exemplary embodiment, the overlapping or continuous logical address sections requested by the trimming requests contained in a trimming command issued by the host 404 are joined together. In an exemplary embodiment, the trimmed space has to align the trimming cells (like the storage units, e.g. U#i, of FIG. 1B, where each storage unit is 4 KB). For a logical address section requested to be trimmed (by invalidating the corresponding mapping information), the head or tail mapping information less than 4 KB and misaligned the 4 KB storage units will not be invalidated. By joining the logical address sections together, the incomplete trimming due to the misaligned situation is reduced.

Figure 6:
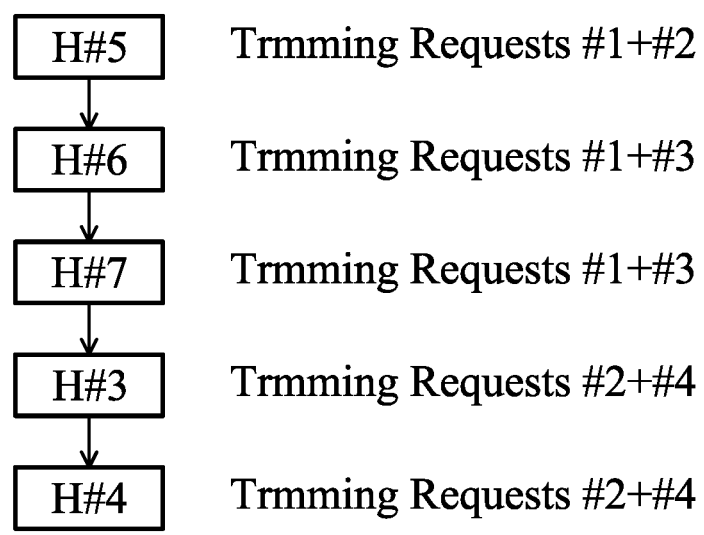
FIG. 6 depicts the integrated space-trimming for the trimming command of FIG. 3.

FIG. 6 depicts the integrated space-trimming for the trimming command of FIG. 3. For simplicity, only the four trimming requests of FIG. 3 are discussed. The four trimming requests of FIG. 3 are processed in accordance with the flow chart of FIG. 5. In FIG. 3, ten rounds of downloading, modification and saving of host block-mapping tables (H2F_H#5→H2F_H#6→H2F_H#7→H2F_H#3→H2F_H#4→H2F_H#5→H2F_H#6→H2F_H#7→H2F_H#3→H2F_H#4) are performed. Such a computing burden is reduced in the disclosure. In FIG. 6, only five rounds of downloading, modification and saving of host block-mapping tables (H2F_H#5→H2F_H#6→H2F_H#7→H2F_H#3→H2F_H#4) are required to complete the four trimming requests of FIG. 3.

Other techniques that use the aforementioned concepts to integrate space-trimming are within the scope of the disclosure. Based on the above contents, the present invention further relates to methods for operating a data storage device.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A data storage device, comprising:
a non-volatile memory;
a random-access storage space; and
a microcontroller, operated by a host to allocate the non-volatile memory for data storage and manage mapping information between logical addresses used in the host and space of the non-volatile memory,
wherein:
the microcontroller transforms a trimming command issued by the host and thereby a target-host block requested to be trimmed several times in trimming requests contained in the trimming command is transformed to be trimmed at a time, wherein the microcontroller transforms the trimming command for trimming combination in units of host block, and a first trimming request and a second trimming request contained in the same trimming command and requesting to trim non-overlapped data of the target-host block are combined together to trim the target-host block at a time; and for the target-host block that has been transformed to be trimmed at a time instead of being trimmed several times, the microcontroller downloads a target-host block-mapping table corresponding to the target-host block from the non-volatile memory to the random-access storage space at a time, and modifies the target-host block-mapping table on the random-access storage space to invalidate mapping information that corresponds to all trimming requests contained in the trimming command and corresponding to the target-host block.

2. The data storage device as claimed in claim 1, wherein:
each of the trimming requests indicates a logical address section using data length and starting logical address.

3. The data storage device as claimed in claim 2, wherein:
the microcontroller joins overlapping or continuous logical address sections indicated by the trimming requests contained in the trimming command.

4. The data storage device as claimed in claim 3, wherein:
the microcontroller converts the joined logical address sections to obtain the target-host block, and modifies the target-host block-mapping table to release space from the non-volatile memory.

5. The data storage device as claimed in claim 1, wherein:
the non-volatile memory is divided into a plurality of storage units; and
the mapping information shows what storage units map to the logical addresses used in the host.

6. The data storage device as claimed in claim 5, wherein:
trimming cells align to the storage units by which misaligned head and tail trimming are ignored.

7. The data storage device as claimed in claim 1, wherein:
the microcontroller invalidates mapping information by rewriting a predefined value to replace the mapping information.

8. A method for operating a data storage device, comprising:
providing a random-access storage space for the data storage device, wherein the data storage device comprises a non-volatile memory;
in response to a host, allocating the non-volatile memory for data storage and managing mapping information between logical addresses used in the host and space in the non-volatile memory;
transforming a trimming command issued by the host and thereby a target-host block requested to be trimmed several times in trimming requests contained in the trimming command is transformed to be trimmed at a time, wherein the trimming command is transformed for trimming combination in units of host block, and a first trimming request and a second trimming request contained in the same trimming command and requesting to trim non-overlapped data of the target-host block are combined together to trim the target-host block at a time; and
for the target-host block that has been transformed to be trimmed at a time instead of being trimmed several times, downloading a target-host block-mapping table corresponding to the target-host block from the non-volatile memory to the random-access storage space at a time, and modifying the target-host block-mapping table on the random-access storage space to invalidate the mapping information that corresponds to all trimming requests contained in the trimming command and corresponding to the target-host block.

9. The method as claimed in claim 8, wherein:
each of the trimming requests indicates a logical address section using data length and starting logical address.

10. The method as claimed in claim 9, further comprising:
joining overlapping or continuous logical address sections indicated by the trimming requests contained in the trimming command.

11. The method as claimed in claim 8, wherein:
the non-volatile memory is divided into a plurality of storage units; and
the mapping information shows what storage units map to the logical addresses used in the host.

12. The method as claimed in claim 11, wherein:
trimming cells align to the storage units by which misaligned head and tail trimming are ignored.

13. The method as claimed in claim 8, wherein:
mapping information is invalidated by rewriting a predefined value to replace the mapping information.

14. A data storage device, comprising:
a non-volatile memory; and
a microcontroller, managing a mapping table to record mapping information between logical addresses and the non-volatile memory and dividing the mapping table into a plurality of host block-mapping tables,
wherein:
the microcontroller receives a trimming command and integrates, in units of host block, trimming requests contained in the trimming command;
a first trimming request and a second trimming request contained in the same trimming command and requesting to trim non-overlapped data of a target-host block are integrated together;
in response to the integrated first trimming request and the second trimming request, a target-host block-mapping table corresponding to the target-host block is downloaded from the non-volatile memory to the random-access storage space at a time rather, and modified on the random-access storage space to invalidate mapping information that corresponds to the first trimming request and the second trimming request.

15. The data storage device as claimed in claim 14, wherein:
the trimming requests are integrated based on host block-mapping tables corresponding to the trimming requests.

16. The data storage device as claimed in claim 14, wherein:
the trimming requests are integrated according to the order of the logical addresses requested in the trimming requests.

17. The data storage device as claimed in claim 14, wherein:
each of the trimming requests indicates a logical address section.

* * * * *